United States Patent
Okamoto et al.

(10) Patent No.: US 8,444,160 B2
(45) Date of Patent: May 21, 2013

(54) SUSPENSION DEVICE

(75) Inventors: Kimio Okamoto, Wako (JP); Hajime Kajiwara, Wako (JP); Masanori Watanabe, Wako (JP); Masatoshi Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/264,605

(22) PCT Filed: Feb. 24, 2010

(86) PCT No.: PCT/JP2010/052843
§ 371 (c)(1),
(2), (4) Date: Oct. 14, 2011

(87) PCT Pub. No.: WO2010/122837
PCT Pub. Date: Oct. 28, 2010

(65) Prior Publication Data
US 2012/0043736 A1 Feb. 23, 2012

(30) Foreign Application Priority Data

Apr. 21, 2009 (JP) ................................ 2009-102940

(51) Int. Cl.
*B60G 3/26* (2006.01)
(52) U.S. Cl.
USPC ........ 280/124.135; 280/93.512; 280/124.143; 280/93.51; 280/124.145
(58) Field of Classification Search
USPC ................... 280/124.136, 124.138, 124.139, 280/124.143, 93.512, 93.51, 86.75, 124.145
See application file for complete search history.

(56) References Cited

U.S. PATENT DOCUMENTS

| | | | | |
|---|---|---|---|---|
| 2,734,753 A | * | 2/1956 | Lind | 280/124.136 |
| 3,952,824 A | * | 4/1976 | Matschinsky | 180/353 |
| 4,978,131 A | * | 12/1990 | Edahiro et al. | 280/124.142 |
| 5,022,673 A | * | 6/1991 | Sekino et al. | 280/124.138 |
| 5,048,860 A | * | 9/1991 | Kanai et al. | 280/86.757 |
| 5,102,159 A | * | 4/1992 | Sato et al. | 280/86.75 |
| 5,116,076 A | * | 5/1992 | Moll | 280/124.138 |
| 5,257,801 A | * | 11/1993 | Matsuzawa et al. | 280/124.138 |

(Continued)

FOREIGN PATENT DOCUMENTS

| | | |
|---|---|---|
| EP | 1 123 821 A2 | 8/2001 |
| JP | 1-311906 A | 12/1989 |

(Continued)

*Primary Examiner* — Nicole Verley
(74) *Attorney, Agent, or Firm* — Carrier Blackman & Associates, P.C.; William D. Blackman; Joseph P. Carrier

(57) ABSTRACT

A suspension device in which a knuckle for supporting a wheel is supported by arms and a damper is connected to the knuckle. A suspension device (10) is configured in such a manner that the intersection (73) between a line extended from an elastic kingpin axis (68) of a rear wheel (31) and a road surface (72) is located on the rear side, relative to the vehicle, of the ground contact center (74) of the rear wheel. The elastic kingpin axis is tilted forward relative to the vehicle and is disposed below the rotation center (32) of the rear wheel in the vertical direction. A lower connection section (81b) of a damper (18) is provided on a line (33) drawn in substantially the vertical direction from the rotation center of the rear wheel. A damper axis (84) is tilted inward in the width direction of the vehicle and tilted forward relative to the vehicle.

5 Claims, 10 Drawing Sheets

U.S. PATENT DOCUMENTS

| | | | | |
|---|---|---|---|---|
| 5,335,933 A * | 8/1994 | Yamamoto et al. | ..... | 280/124.138 |
| 5,415,427 A * | 5/1995 | Sommerer et al. | ..... | 280/124.142 |
| 5,499,839 A * | 3/1996 | Wahl et al. | ............. | 280/124.145 |
| 5,507,510 A * | 4/1996 | Kami et al. | ............. | 280/124.136 |
| 5,697,633 A * | 12/1997 | Lee | ........................ | 280/124.136 |
| 5,868,410 A * | 2/1999 | Kawabe et al. | .......... | 280/124.15 |
| 5,873,587 A * | 2/1999 | Kawabe et al. | ........ | 280/124.135 |
| 6,089,582 A * | 7/2000 | Hasshi | ..................... | 280/93.512 |
| 6,752,409 B1 * | 6/2004 | Kunert | .................. | 280/124.138 |
| 7,048,286 B2 * | 5/2006 | Eppelein | ................ | 280/124.106 |
| 7,243,934 B2 * | 7/2007 | Lee et al. | ............. | 280/124.128 |
| 7,258,355 B2 * | 8/2007 | Amano | ................. | 280/124.134 |
| 7,281,716 B2 * | 10/2007 | Fanson | ........................ | 280/5.52 |
| 7,398,982 B2 * | 7/2008 | Hozumi | .................. | 280/93.512 |
| 7,798,507 B2 * | 9/2010 | Hirai | ...................... | 280/124.135 |
| 7,967,310 B2 * | 6/2011 | Frasch et al. | ........... | 280/124.143 |
| 8,052,160 B2 * | 11/2011 | Hirai | ...................... | 280/124.135 |
| 2001/0028156 A1 * | 10/2001 | Handa | ...................... | 280/93.512 |
| 2005/0140110 A1 * | 6/2005 | Lee et al. | ............... | 280/124.109 |
| 2005/0280241 A1 * | 12/2005 | Bordini | ................. | 280/124.135 |

FOREIGN PATENT DOCUMENTS

| | | |
|---|---|---|
| JP | 06-278429 A | 10/1994 |
| JP | 11-048728 A | 2/1999 |
| JP | 2002-539009 A | 11/2002 |
| JP | 2007-084070 A | 4/2007 |
| JP | 2009-029157 A | 2/2009 |

* cited by examiner

US 8,444,160 B2

SUSPENSION DEVICE

TECHNICAL FIELD

The present invention relates to a suspension device, in which a plurality of arms support a knuckle, a damper is connected to the knuckle, and the knuckle supports a wheel.

BACKGROUND ART

Suspension devices include multi-link suspensions, in which a damper and a plurality of arms are laid out so that a reaction force acting on the damper (hereafter referred to as a "damper reaction force") or a lateral force acting on the wheel (i.e., a force in the width direction of the vehicle) acts in the toe-in direction of the wheel.

Specifically, the layout of the arms is configured so that the damper reaction force acts on the rear, with respect to the vehicle, relative to the elastic kingpin axis in order to cause the damper reaction force to act in the toe-in direction of the wheel.

Furthermore, the layout of the arms is configured so that the caster trail is a negative value, i.e., so that the intersection of the elastic kingpin axis and a ground contact surface is positioned to the rear of the vehicle body relative to the ground contact center (contact patch center) of the wheel, in order to cause the lateral force acting on the wheel (i.e., the force in the width direction of the vehicle) to act in the toe-in direction of the wheel.

In this suspension device, in order to cause the damper reaction force or the lateral force acting on the wheel (i.e., the force in the width direction of the vehicle) to act in the toe-in direction, in addition to the layout described above, the elastic kingpin axis is inclined towards the rear side of the vehicle, and the damper is offset rearward of the vehicle relative to the wheel center (e.g., see Patent Reference 1).

With regards to the damper disclosed in Patent Reference 1, an upper end part is connected to a vehicle body, and a lower end part is connected to a knuckle. With regards to the arms, an inner end part is connected to the vehicle body, and an outer end part is connected to the knuckle. When a damper of such description is offset rearwards of the vehicle body relative to the wheel center, the damper reaction force acts as a force that attempts to cause the knuckle to rotate (about the wheel center).

As a result, a torsional force is generated in the arms to prevent rotation of the knuckle. In order for the arms to bear the generated torsional force, it is necessary to set a large outside diameter dimension for each of the arms and increase the stiffness of each of the arms. Also, in an instance in which each of the arms is a tube, it is necessary to set a large wall thickness dimension for each of the arms and increase the stiffness of each of the arms.

However, if a large outside diameter dimension or wall thickness dimension is set for the arms, it is difficult to minimize cost. Also, if a large outside diameter dimension or wall thickness dimension is set for the arms, there is a risk of the unsprung weight increasing, affecting the road-following performance and reducing riding comfort.

Also, in order to prevent rotation of the knuckle, a torsional force is generated in a support bracket that connects each of the arms to the vehicle body side. Therefore, in order for the support brackets to bear the torsional force, it is necessary to increase the stiffness of the support bracket, causing an increase in cost or the vehicle weight.

PRIOR ART LITERATURE

Patent Literature

Patent Literature 1: JP-A 2007-84070

SUMMARY OF INVENTION

Technical Problem

An object of the present invention is to provide a suspension device in which the weight of a plurality of arms or a support bracket can be reduced.

Solution to Problem

According to an aspect of the present invention, there is provided a suspension device comprising: a plurality of arms; a knuckle connected to a vehicle body of a vehicle through the arms for supporting a wheel of the vehicle; and a damper for producing a reaction force directed in an up-and-down direction in response to an up-and-down movement of the wheel so as to apply the reaction force to the knuckle, the damper having an upper connection section connected to the vehicle body and a lower connection section connected to the knuckle, wherein an intersection of an elastic kingpin axis of the wheel and a road surface is disposed rearward of a contact patch center of the wheel, the elastic kingpin axis tilts forward of the vehicle and passes through a point offset vertically downwardly from a center of rotation of the wheel, the lower connection section of the damper is disposed on a line extending substantially vertically through the center of rotation of the wheel, and the damper has a longitudinal axis tilting forward and laterally inwardly of the vehicle.

Preferably, the plurality of arms comprises front and rear upper arms connected to portions of the knuckle disposed above the center of rotation of the wheel, and at least one lower arm connected to a portion of the knuckle disposed below the center of rotation of the wheel, the front upper arm being disposed forward of the center of rotation of the wheel, the front upper arm tilting at a smaller angle than the rear upper arm relative to an axis extending laterally of the vehicle.

Preferably, the longitudinal axis of the damper tilts at an angle approximating to an angle at which the elastic kingpin axis tilts.

Effect of the Invention

In the present invention, the intersection of the line extended from the elastic kingpin axis of the wheel and the road surface is disposed on the rear side, with respect to the vehicle, of the ground contact center of the wheel. Therefore, a lateral force acting on the wheel from the road surface (i.e., a force in the width direction of the vehicle) can be made to act at the front, with respect to the vehicle, relative to the elastic kingpin axis. Therefore, it is possible for there to be generated a moment that acts to turn the wheel about the elastic kingpin axis in a toed-in direction (hereafter referred to as the "toe-in direction") when a lateral force acts on the wheel from the road surface. Therefore, the lateral force acting on the wheel from the road surface can be made to turn the wheel in the toe-in direction. "Toe-in" refers to a state in which wheels are pointing inwards when the vehicle is viewed from above.

Also, the elastic kingpin axis is tilted forward with respect to the vehicle when viewed from the side of the vehicle, and is disposed below the rotation center of the wheel in the vertical direction. Also, the lower connection section of the cushioning device is provided at a position upward, in a substantially vertical direction, from the rotation center of the wheel. Therefore, the lower connection section of the cushioning device can be provided to the rear, with respect to the vehicle, relative to the elastic kingpin axis. It is thereby possible to cause the reaction force of the cushioning device acting in the up/down direction to act to the rear, with respect to the vehicle, relative to the elastic kingpin axis; and to generate a moment that acts to turn the wheel in the toe-in direction about the elastic kingpin axis. Therefore, the wheel can be turned in the toe-in direction using the reaction force of the cushioning device acting in the up/down direction.

Also, the lower connection section of the cushioning device is provided on a line extended in a substantially vertical direction from the rotation center of the wheel. It is thereby possible to cause the reaction force of the cushioning device acting in the up/down direction to act on the center of the knuckle. The reaction force of the cushioning device acting in the up/down direction can thereby be prevented from acting as a rotation force on the knuckle, and torsional force acting on the plurality of arms can be reduced. Reducing the torsional force acting on the arms makes it possible to minimize the outside diameter dimension of the arms, and, in an instance in which each of the arms is a tube, reduce the wall thickness of each of the arms. Minimizing the outside diameter dimension or the wall thickness of each of the arms makes it possible to reduce cost and weight. Thus, reducing the weight of the arms makes it possible to reduce the unsprung weight, secure adequate road-following performance of the wheel, and maintain satisfactory riding comfort.

The arms are connected to the vehicle body-side by support brackets. Preventing the reaction force of the cushioning device from acting as a rotation force on the knuckle thereby makes it possible to inhibit a torsional force from acting on the support brackets. It thereby becomes possible to minimize the stiffness of the support bracket, and reduce cost and weight.

In the present invention, the front upper arm is provided to the front side, with respect to the vehicle, of the rotation center of the wheel. The tilt angle of the front upper arm is configured so as to be smaller than that of the rear upper arm. It is thereby possible to support, in an instance in which a lateral force acts on the wheel from the road surface, to support, using the front upper arm, a force that acts to turn the wheel in the toe-in direction about the elastic kingpin axis in a satisfactory manner. Using the front upper arm to support a force that acts to turn the wheel in the toe-in direction makes it possible to minimize the orientation of the wheel from changing excessively in the toe-in direction when the lateral force acts on the wheel from the road surface. Specifically, the front upper arm is capable of functioning as a control arm for restricting the change in [the orientation of] the wheel in the toe-in direction. It is thereby possible to provide the suspension device with means for adjusting the toe change characteristics of the wheel, and to increase the degree of freedom in terms of designing the suspension device.

Also, in the present invention, the axis of the cushioning device is configured so as to approach the tilt of the elastic kingpin axis. The reaction force of the cushioning device acting in the up/down direction can thereby be used, in an efficient manner, as a force for generating a moment that acts to turn the wheel in the toe-in direction about the elastic kingpin axis. It thereby becomes possible to turn the wheel in the toe-in direction in an even more satisfactory manner using the reaction force of the cushioning device acting in the up/down direction. Therefore, in an instance in which the wheel is a rear wheel, it is possible to minimize sliding of the vehicle rear (i.e., tail slide) in a satisfactory manner, and improve turning performance.

DESCRIPTION OF EMBODIMENTS

A preferred embodiment of the present invention will now be described with reference to the accompanying drawings.

Figure 1:
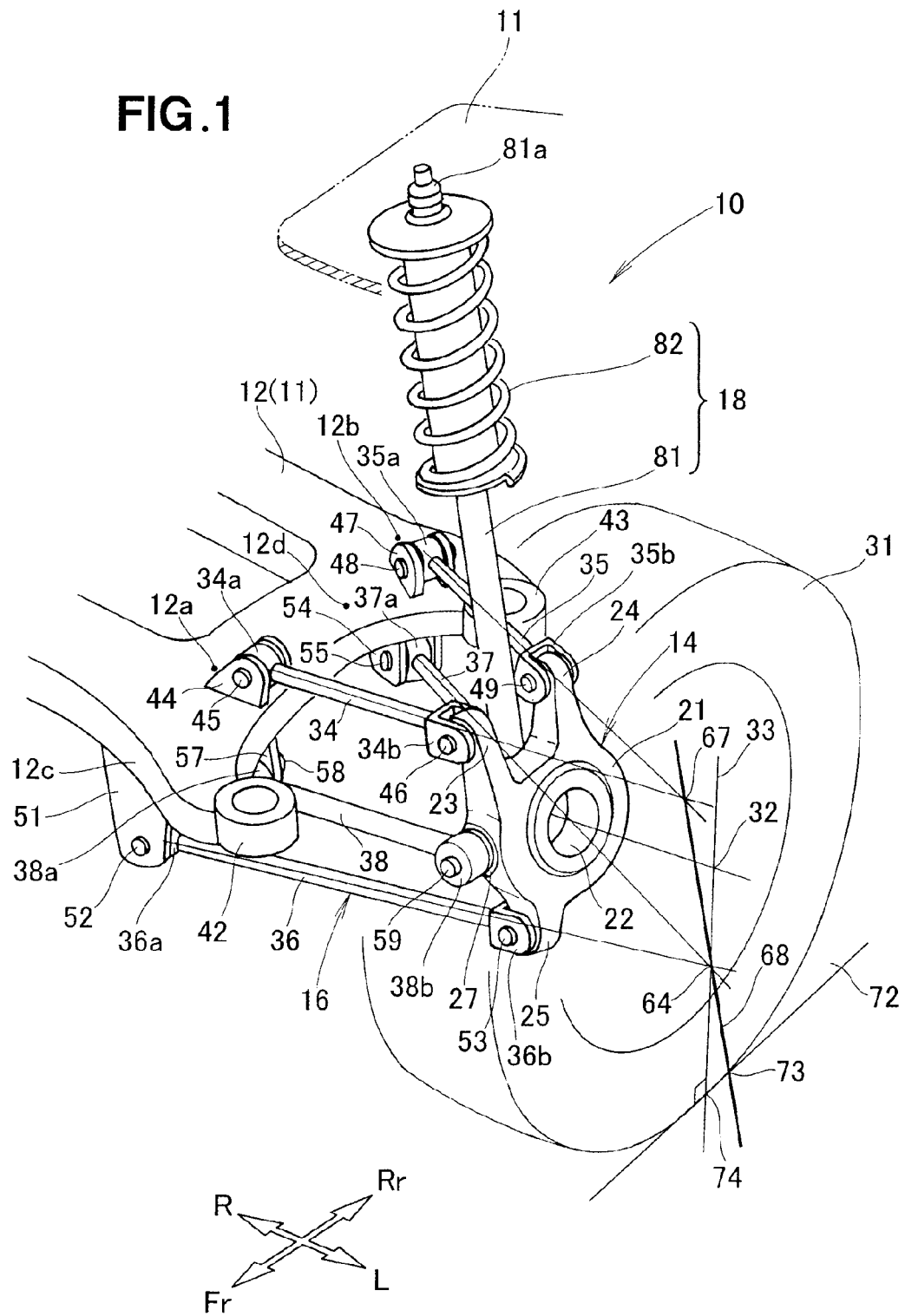
FIG. 1 is a perspective view showing a suspension device according to an embodiment of the present invention.
Figure 2:
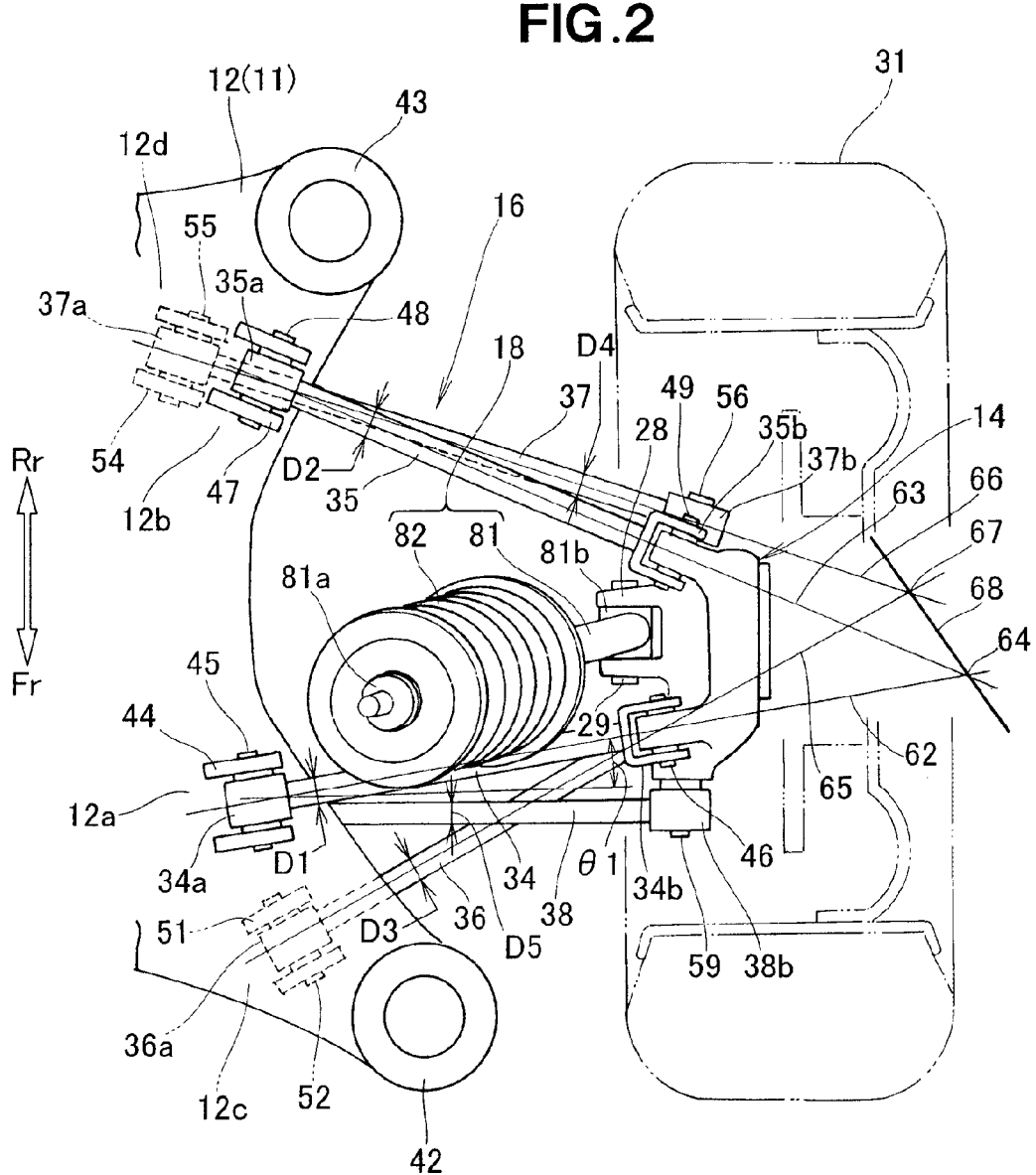
FIG. 2 is a plan view of the suspension device shown in FIG. 1.
Figure 3:
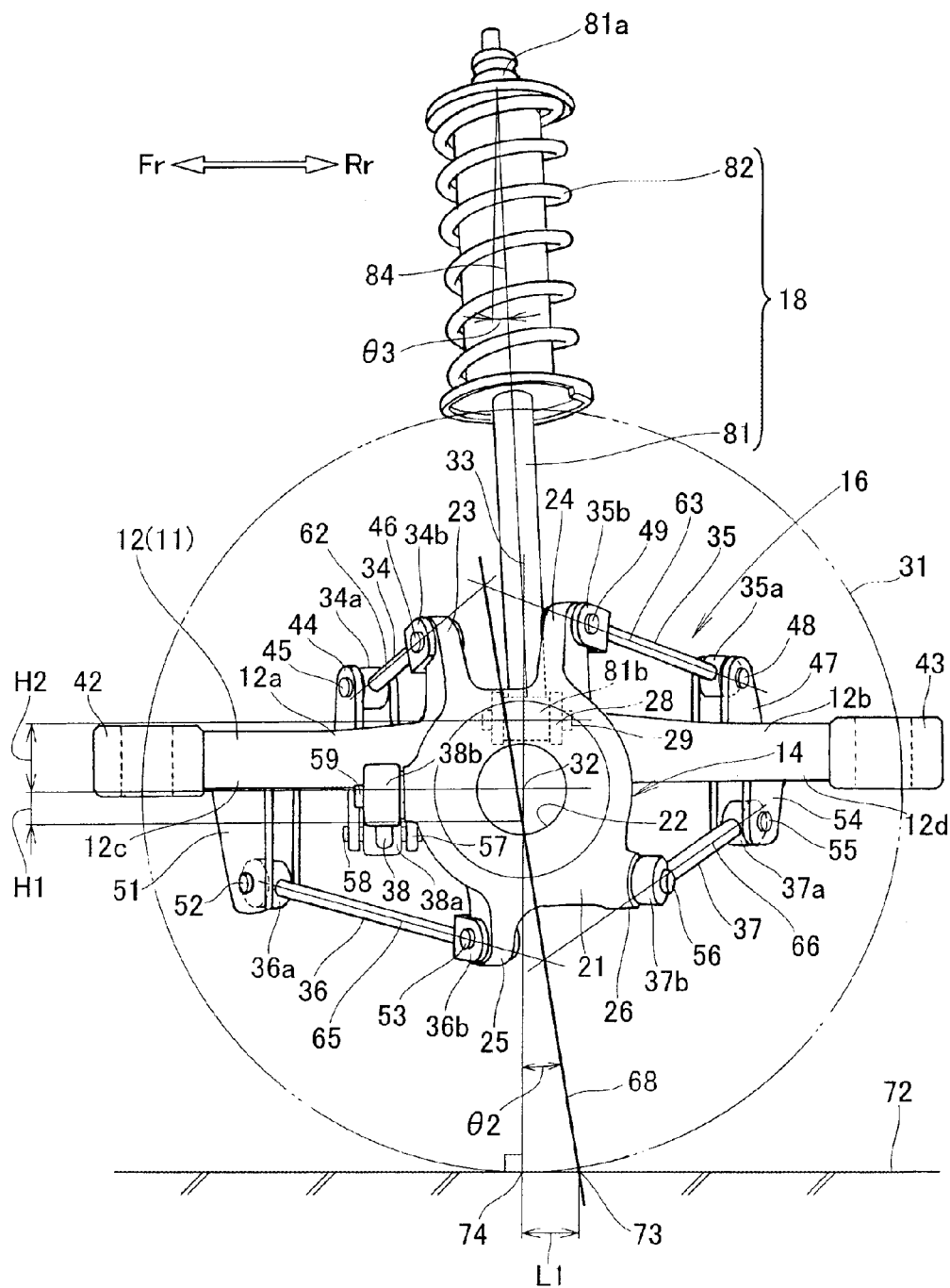
FIG. 3 is a side view of the suspension device shown in FIG. 1

With reference to FIGS. 1 through 3, a suspension device 10 is a multi-link-type suspension comprising a link unit 16 for connecting a knuckle 14 to a subframe 12 of a vehicle body 11, and a cushioning device (i.e., a damper) 18 connected to the knuckle 14 and the vehicle body 11.

Each of front and rear attaching parts 42, 43 of the subframe 12 is attached to a rear frame (i.e., a vehicle body) by a bolt.

The knuckle 14 includes a knuckle body 21. The knuckle body 21 has an opening 22 formed at substantially the center thereof. A front upper connection section 23 and a rear upper connection section 24 are provided to an upper part of the knuckle body 21. A front lower connection section 25 and a rear lower connection section 26 are provided to a lower part of the knuckle body 21. A center connection section 27 is provided at a center on the front of the knuckle body 21. The knuckle body 21 has a damper connection section 28 provided on an inside in the width direction of the vehicle (see FIG. 5).

A wheel bearing is provided to the opening 22 of the knuckle 14, a hub is provided to the wheel bearing, and a rear wheel 31 (i.e., a vehicle wheel) 31 is provided to the hub. Specifically, the knuckle 14 supports the rear wheel 31 with the wheel bearing and the hub interposed therebetween.

Each of the front upper connection section 23 and the rear upper connection section 24 is provided to a portion of the knuckle 14 above a center of rotation 32 of the rear wheel 31, and respectively connects front and rear upper arms 34, 35 described further below. Each of the front lower connection section 25 and the rear lower connection section 26 is provided to a portion of the knuckle 14 below the rotation center of the rear wheel, and respectively connects front and rear lower arms 36, 37 described further below. The center connection section 27 connects a control arm 38 described further below. The damper connection section 28 connects a lower connection section 81b of a shock absorber 81 described further below (see FIG. 5).

The link unit 16 comprises a plurality of arms for connecting the knuckle 14 to the subframe 12 of the vehicle body 11. The link unit 16 comprises the front and rear upper arms 34, 35 connected to the front upper connection section 23 and the rear upper connection section 24 respectively; the front and rear lower arms 36, 37 connected to the front lower connection section 25 and the rear lower connection section 26 respectively; and the control arm 38 for regulating the rotational displacement of the rear wheel 31 around an elastic kingpin axis 68.

The outside diameter dimension of the front upper arm 34 is designed so as to be equal to D1 (shown in FIG. 2). A vehicle body-side attaching part 34a of the front upper arm 34 is attached to a front upper support bracket 44 so as to be capable of turning in the up/down direction, with a support pin 45 interposed therebetween. A knuckle-side attaching part 34b of the front upper arm 34 is attached to the front upper connection section 23 so as to be capable of turning in the up/down direction, with a support pin 46 interposed therebetween. The front upper support bracket 44 is provided to a front upper part 12a of the subframe 12.

The outside diameter dimension of the rear upper arm 35 is designed so as to be equal to D2 (shown in FIG. 2). A vehicle body-side attaching part 35a of the rear upper arm 35 is attached to a rear upper support bracket 47 so as to be capable of turning in the up/down direction, with a support pin 48 interposed therebetween. A knuckle-side attaching part 35b of the rear upper arm 35 is attached to the rear upper connection section 24 so as to be capable of turning in the up/down direction, with a support pin 49 interposed therebetween. The rear upper support bracket 47 is provided to a rear upper part 12b of the subframe 12.

The outside diameter dimension of the front lower arm 36 is designed so as to be equal to D3 (shown in FIG. 2). A vehicle body-side attaching part 36a of the front lower arm 36 is attached to a front lower support bracket 51 so as to be capable of turning in the up/down direction, with a support pin 52 interposed therebetween. A knuckle-side attaching part 36b of the front lower arm 36 is attached to the front lower connection section 25 so as to be capable of turning in the up/down direction, with a support pin 53 interposed therebetween. The front lower support bracket 51 is provided to a front lower part 12c of the subframe 12.

The outside diameter dimension of the rear lower arm 37 is designed so as to be equal to D4 (shown in FIG. 2). A vehicle body-side attaching part 37a of the rear lower arm 37 is attached to a rear lower support bracket 54 so as to be capable of turning in the up/down direction, with a support pin 55 interposed therebetween. A knuckle-side attaching part 37b of the rear lower arm 37 is attached to the rear lower connection section 26 so as to be capable of turning in the up/down direction, with a support pin 56 interposed therebetween. The rear lower support bracket 54 is provided to a rear lower part 12d of the subframe 12.

The outside diameter dimension of the control arm 38 is designed so as to be equal to D5 (shown in FIG. 2). A vehicle body-side attaching part 38a of the control arm 38 is attached to a center lower support bracket 57 so as to be capable of turning in the up/down direction, with a support pin 58 interposed therebetween. A knuckle-side attaching part 38b of the control arm 38 is attached to the center connection section 27 so as to be capable of turning in the up/down direction, with a support pin 59 interposed therebetween. The center lower support bracket 57 is provided to the front lower part 12c of the subframe 12.

Each of the front and rear upper arms 34, 35; the front and rear lower arms 36, 37; and the control arm 38 of the link unit 16 swings in the up/down direction about the support pins 45, 48, 52, 55, 58, whereby the link unit 16, along with the knuckle 14, supports the rear wheel 31 so as to be moveable in the up/down direction.

The front upper arm 34 is provided in the front direction of the vehicle body relative to the rotation center 32 of the rear wheel 31, and is configured so as to tilt in the width direction of the vehicle at a smaller angle θ1 (see FIG. 2) than the rear upper arm 35. The reason for the tilt angle θ1 of the front upper arm 34 being configured so as to be smaller than that of the rear upper arm 35 will be described [further below] with reference to FIG. 9.

Figure 4:
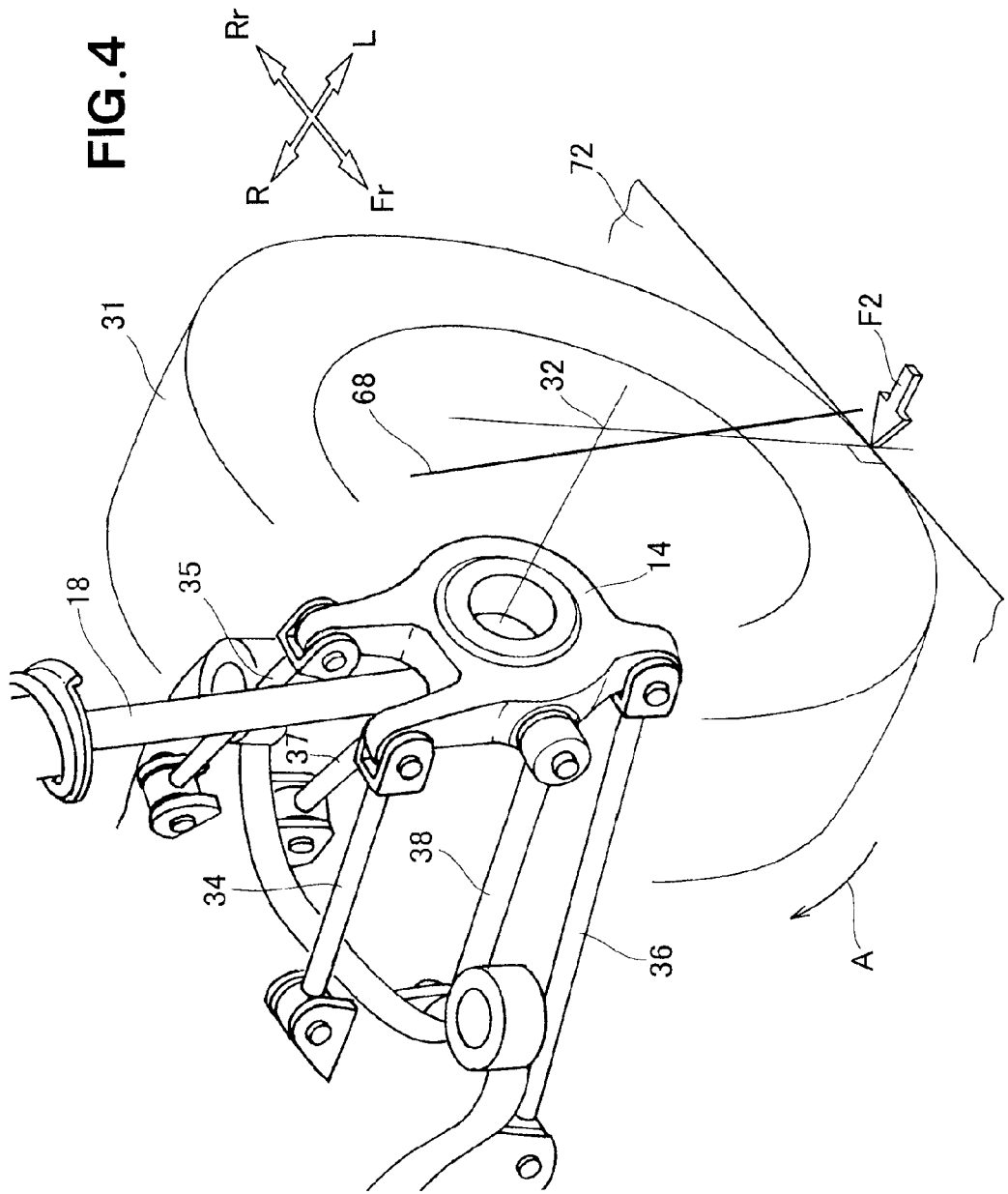
FIG. 4 is a schematic diagram used to illustrate an elastic kingpin axis in the suspension device shown in FIG. 1.

As shown in FIG. 2, a line that links an intersection 64 of respective axes 62, 63 of the front and rear upper arms 34, 35 extended towards the outside in the width direction of the vehicle and an intersection 67 of respective axes 65, 66 of the front and rear lower arms 36, 37 extended towards the outside in the width direction of the vehicle is the elastic kingpin axis 68 of the rear wheel 31. As shown in FIG. 4, the elastic kingpin axis 68 is the steering axis regarding an instance in which a force (i.e., a lateral force, a longitudinal force, or another force) is applied to the rear wheel 31, steering the rear wheel 31 and generating a change in the toe angle.

The elastic kingpin axis 68 can be more accurately defined as follows. Specifically, the elastic kingpin axis 68 is a steering axis that links points at which no change in the toe angle or the steering angle occurs when a force (i.e., a lateral force, a longitudinal force, or another force) is applied to the rear wheel 31. The elastic kingpin axis 68 can be configured at a desired position using the arrangement and length of each of the arms 34, 35, 36, 37 supporting the rear wheel 31 and characteristics (i.e., spring rate and damping characteristics) of an elastic member (i.e., bush) interposingly provided at end parts of each of the arms 34, 35, 36, 37. In this instance, the lateral force is generated by an external force, and the longitudinal force is generated by driving or braking applied on the vehicle or is generated due to an effect of the road surface.

As shown in FIG. 3, the elastic kingpin axis 68 is configured so that the caster trail L1 is a negative value, i.e., so that an intersection 73 with the road surface (i.e., ground contact surface) 72 is positioned towards the rear of the vehicle body relative to the position of a ground contact center (contact patch center) 74 of the rear wheel 31. It thereby becomes possible to cause the lateral force F2 (i.e., the force in the width direction of the vehicle) acting on the rear wheel 31 from the road surface 72 to act at the front, with respect to the vehicle body, relative to the elastic kingpin axis 68, as shown in FIG. 4. It thereby becomes possible to turn the rear wheel 31 in the toe-in direction (i.e., the direction shown by arrow A) about the elastic kingpin axis 68.

As shown in FIG. 3, the elastic kingpin axis 68 tilts forward with respect to the vehicle at a tilt angle θ2. Also, the elastic kingpin axis 68 is disposed below the rotation center 32 of the rear wheel 31 in the vertical direction by a distance H1.

Figure 5:
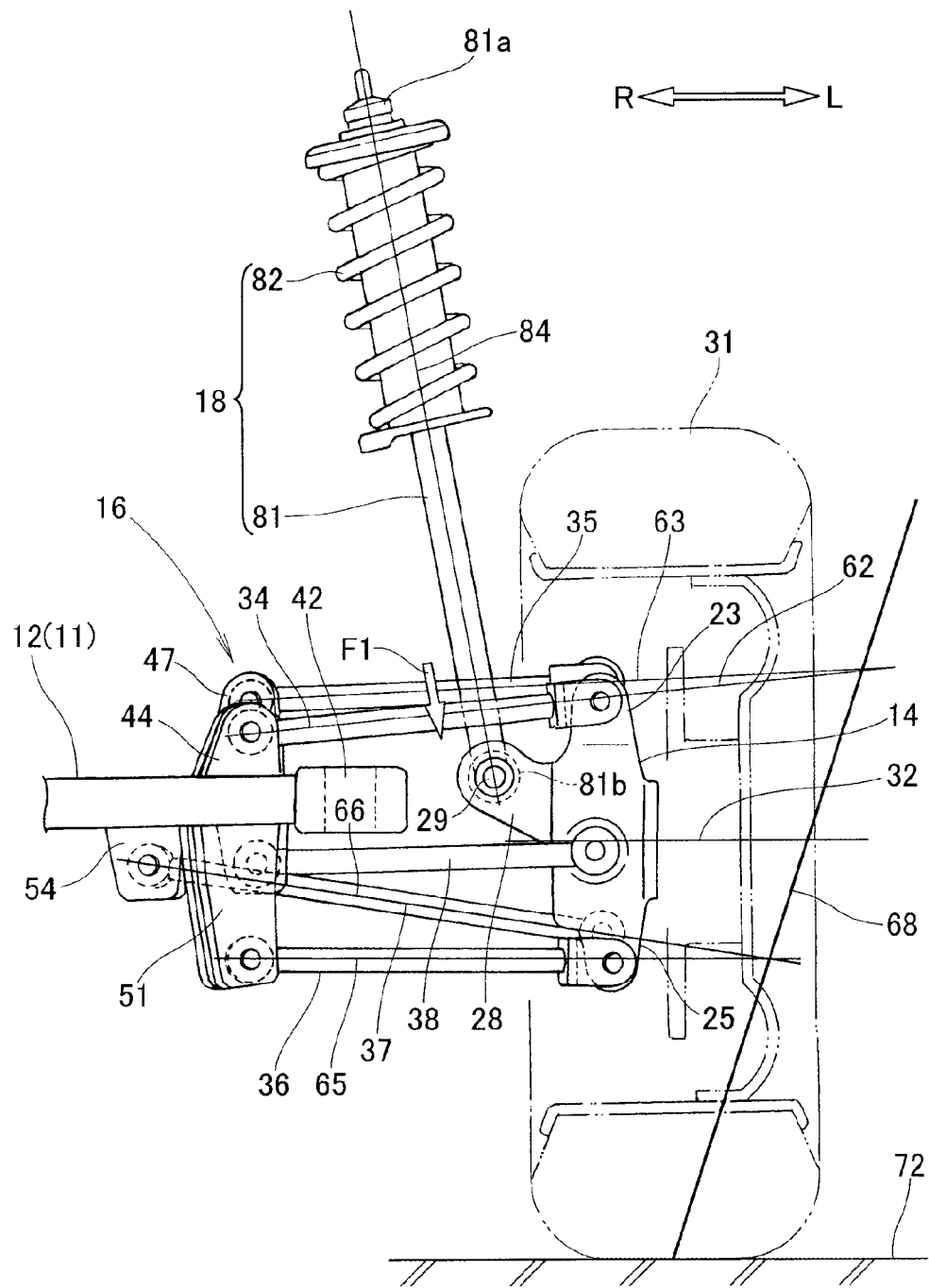
FIG. 5 is a front view of the suspension device shown in FIG. 1.

As shown in FIG. 5, the damper 18 comprises a shock absorber 81, an upper connection section 81a of which is connected to the vehicle body 11 (see FIG. 1) and a lower connection section 81*b* of which is connected to the damper connection section 28 of the knuckle 14 by a connection pin 29; and a coil spring 82 provided to the shock absorber 81.

When the damper 18 undergoes a stroke (i.e., extends/contracts) in the up/down direction, a damping force is generated so as to act against the stroke (i.e., extension/contraction). In other words, in an instance in which a force (e.g., an external force) is applied to the damper 18, thereby subjecting the damper 18 to an extending/contracting force, a damping force is generated as a reaction force against the extending/contracting force, and the damping force acts on the knuckle 14. Specifically, when the rear wheel 31 experiences, e.g., a bump or a rebound, a force is generated in the opposite direction. Therefore, this damping force represents a downward reaction force (hereafter referred to as "damper reaction force") F1 generated in the damper 18 in the up/down direction (i.e., axial direction).

As shown in FIG. 3, in the damper 18, the lower connection section 81*b* (i.e., connection pin 29) of the damper 18 is provided on an extension line 33 extending in a substantially vertical direction from the rotation center 32 of the rear wheel 31 when viewed from the side of the vehicle. Specifically, the lower connection section 81*b* (i.e., connection pin 29) of the damper 18 is provided above the rotation center 32 of the rear wheel 31 in a substantially vertical direction by a distance H2 when viewed from the side of the vehicle.

The reason for providing the lower connection section 81*b* (i.e., connection pin 29) of the damper 18 on the extension line 33 extending from the rotation center 32 of the rear wheel 31 in a substantially vertical direction will be described further below with reference to FIG. 8. Also, the reason for providing the lower connection section 81*b* (i.e., connection pin 29) of the damper 18 above the rotation center 32 in a substantially vertical direction by a distance H2, and for providing the elastic kingpin axis 68 below the rotation center 32 in a substantially vertical direction by a distance H1, will be described further below with reference to FIG. 7.

The axial line 84 of the damper 18 (hereafter referred to as "damper axial line") is tilted inwards in the width direction of the vehicle as shown in FIG. 5 and is tilted forward with respect to the vehicle at a tilt angle θ3 as shown in FIG. 3.

Tilting the damper axial line 84 forward with respect to the vehicle at a tilt angle θ3 causes the orientation of the damper axial line 84 to approach the tilt of the elastic kingpin axis 68 at a tilt angle θ2. The reason for tilting the damper axial line 84 so as to approach the tilt of the elastic kingpin axis 68 will be described in detail further below with reference to FIG. 7.

Next, a description will be given for an example in which the lateral force (i.e., force in the width direction of the vehicle) F2 acting on the rear wheel 31 is used to turn the rear wheel 31 in the toe-in direction, with reference to FIG. 6.

Figure 6:
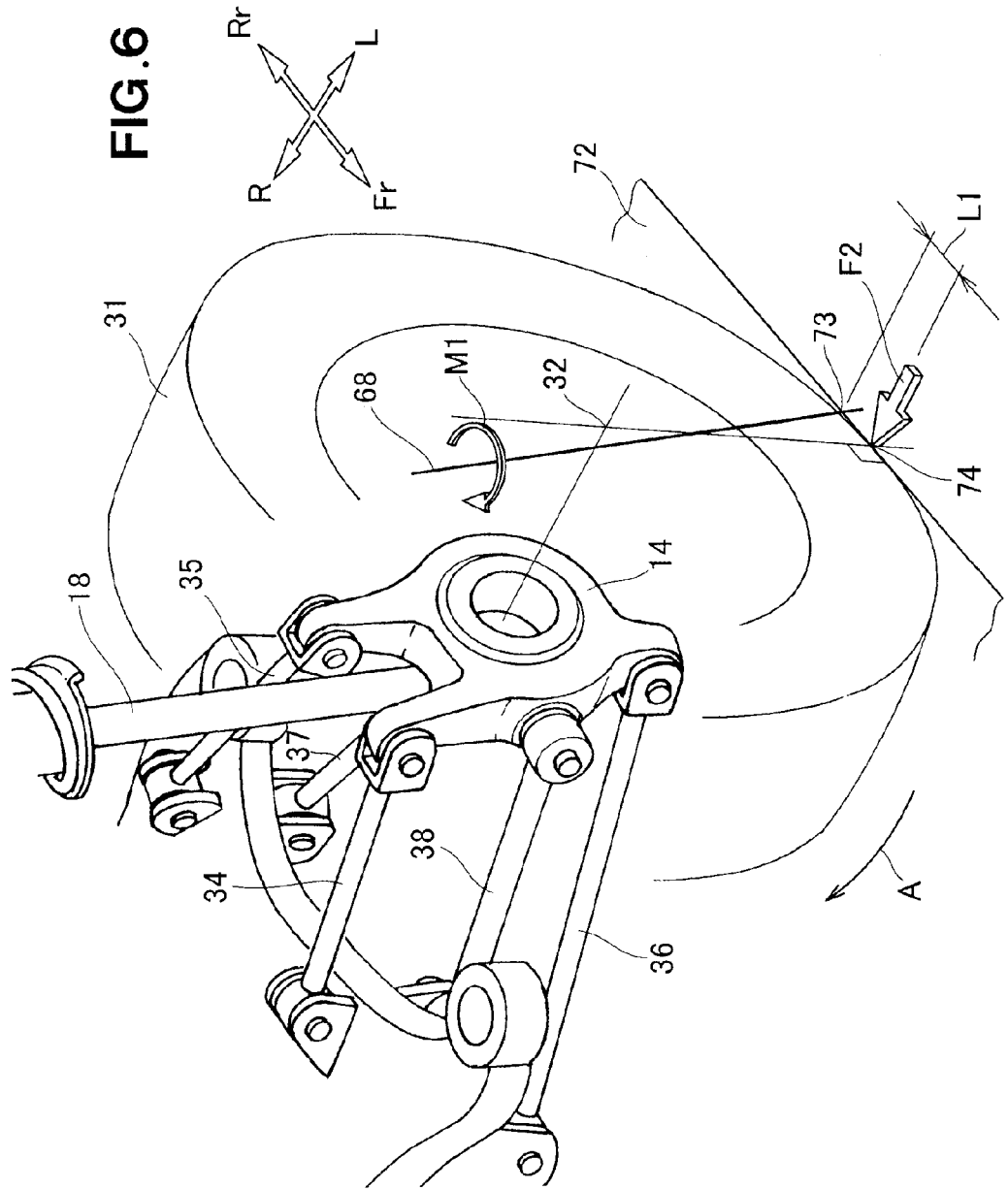
FIG. 6 is a view showing an example in which the rear wheel is turned in the toe-in direction using a lateral force (i.e., force acting in the width direction of the vehicle) acting on the rear wheel.

As shown in FIG. 6, the intersection 73 between the elastic kingpin axis 68 of the rear wheel 31 and the road surface 72 is disposed on the rear side, with respect to the vehicle, of the ground contact center 74 of the rear wheel 31. The lateral force (i.e., force in the width direction of the vehicle) F2 acting on the rear wheel 31 from the road surface 72 can thereby be caused to act at the front, with respect to the vehicle body, relative to the elastic kingpin axis 68.

Thus it is possible, when the lateral force F2 acts on the rear wheel 31 from the road surface 72, to generate a moment M1 that acts to turn the rear wheel 31 in the toe-in direction (i.e., direction indicated by arrow A) about the elastic kingpin axis 68. Therefore, it is possible to turn the rear wheel 31 in the toe-in direction (i.e., direction indicated by arrow A) using the lateral force F2 acting on the rear wheel 31 from the road surface 72, minimize sliding of the vehicle rear (i.e., tail sliding) in a satisfactory manner, and improve turning performance and similar performance.

Figure 7:
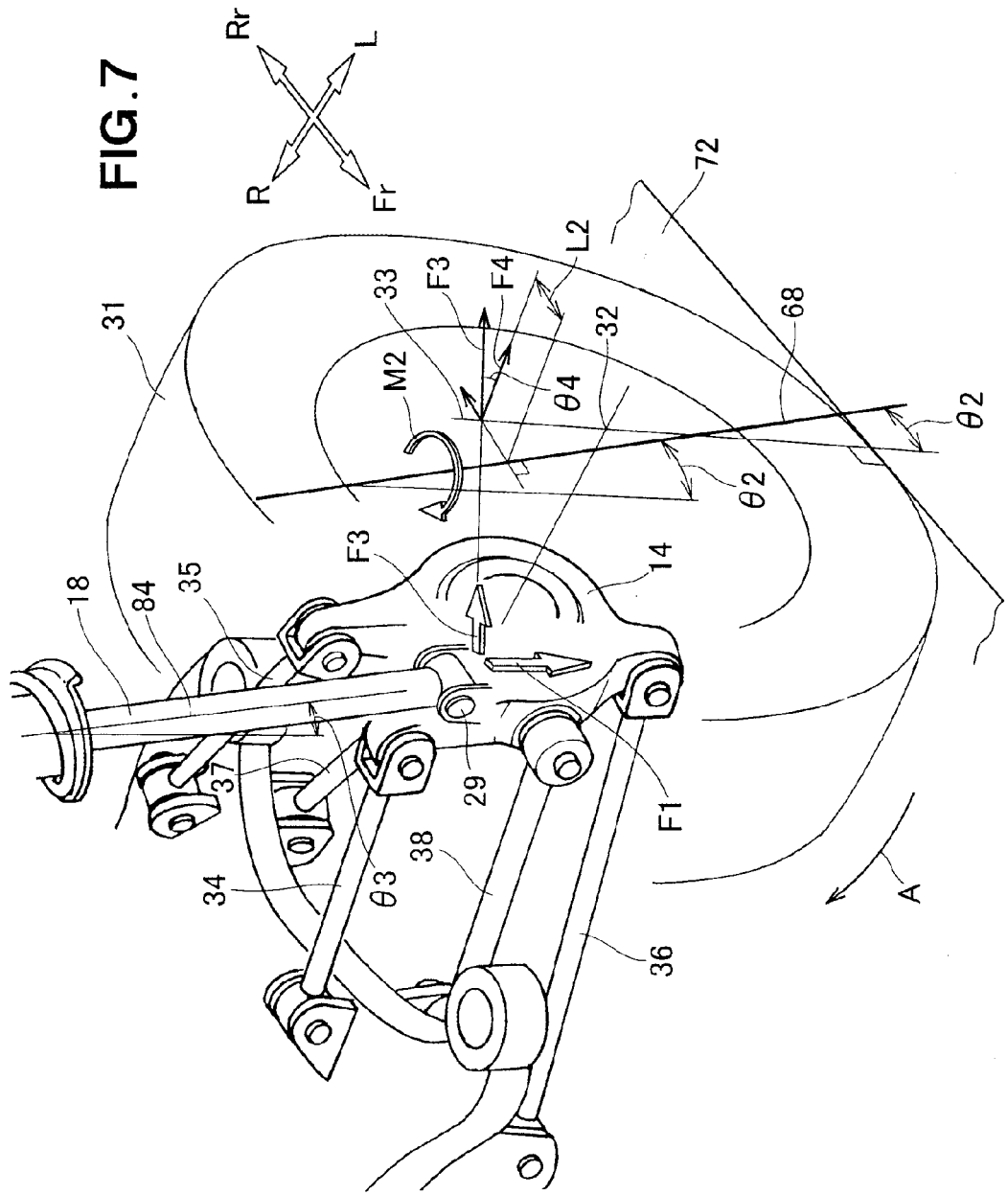
FIG. 7 is a view showing an example in which the rear wheel is turned in the toe-in direction using the reaction force of the damper.

Next, a description will be given for an example in which the damper reaction force F1 of the damper 18 is used to turn the rear wheel 31 in the toe-in direction, with reference to FIGS. 3 and 7.

As shown in FIG. 3, the elastic kingpin axis 68 is tilted forward with respect to the vehicle, and disposed below the rotation center 32 of the rear wheel 31 in the vertical direction by a distance H1. Also, the lower connection section 81*b* (i.e., connection pin 29) of the damper 18 is provided above the rotation center 32 of the rear wheel 31 in a substantially vertical direction by a distance H2. Therefore, the lower connection section 81*b* (i.e., connection pin 29) of the damper 18 can be provided to the rear, with respect to the vehicle body, relative to the elastic kingpin axis 68. Of the damper reaction force F1 acting in the downward direction in the damper 18, a force component F3 that intersects with the elastic kingpin axis 68 can thereby be caused to act at the rear, with respect to the vehicle, relative to the elastic kingpin axis 68 by a distance L2 as shown in FIG. 7.

The elastic kingpin axis 68 is tilted at a tilt angle θ2, and the damper axial line 84 is tilted at a tilt angle θ3. A force component (hereafter referred to as "toe-in force component") F4 of the force component F3 acts as a force that turns the rear wheel 31 in the toe-in direction (i.e., direction indicated by arrow A) about the elastic kingpin axis 68.

Toe-in force component $F4 = F3 \times \cos \theta 4$

Where $\theta 4 = \theta 2 - \theta 3$

Thus, causing the force component F3 to act at the rear, with respect to the vehicle, relative to the elastic kingpin axis 68 makes it possible to cause the toe-in force component F4 to act so as to turn the rear wheel 31 in the toe-in direction (i.e., the direction indicated by arrow A) about the elastic kingpin axis 68. It is thereby possible to generate a moment M2 (i.e., $M2 = F4 \times L2$) that turns the rear wheel 31 in the toe-in direction (i.e., the direction indicated by arrow A) about the elastic kingpin axis 68. It is therefore possible to use the damper reaction force F1 acting in the downward direction in the damper 18 to turn the rear wheel 31 in the toe-in direction (i.e., the direction indicated by arrow A), minimize sliding of the vehicle rear (i.e., tail slide) in a satisfactory manner, and improve turning performance and similar performance.

The damper axial line 84 [is tilted] at a tilt angle θ3, causing the tilt of the damper axial line 84 to approach the tilt angle θ2 of the elastic kingpin axis 68. It thereby becomes possible to minimize θ4 (i.e., θ2−θ3), and to obtain a large toe-in force component F4. The force component F3 of the damper reaction force F1 can thereby be used, in an efficient manner, as a force for generating the moment M2. Therefore, it becomes possible to use the damper reaction force F1 acting in the downward direction in the damper 18 to turn the rear wheel 31 in the toe-in direction (i.e., the direction indicated by arrow A) in an even more efficient manner, minimize sliding of the vehicle rear (i.e., tail sliding) in an even more satisfactory manner, and further improve turning performance and similar performance.

Next, a description will be given for an example in which the damper reaction force F1 in the damper 18 acts on the link unit 16, with reference to FIG. 8.

Figure 8:
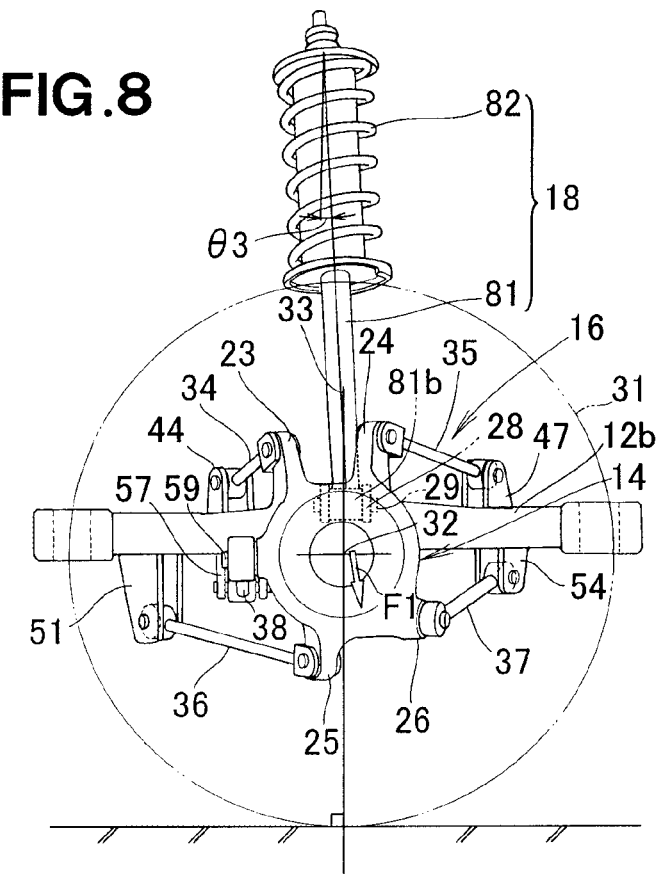
FIG. 8 is a view showing an example in which the reaction force of the damper acts on the link unit.

As shown in FIG. 8, the lower connection section 81*b* (i.e., the connection pin 29) of the damper 18 is provided on the extension line 33 extended from the rotation center 32 of the rear wheel 31 in a substantially vertical direction. It is thereby possible to cause the damper reaction force F1 of the damper 18 acting in the up/down direction to act on the center of the knuckle 14. The damper reaction force F1 of the damper 18 acting in the up/down direction can thereby be prevented from acting as a rotation force on the knuckle 14. Therefore, it is possible to reduce the torsional force acting on the link unit 16 (i.e., the front and rear upper arms 34, 35; the front and rear lower arms 36, 37; and the control arm 38).

Thus reducing the torsional force acting on the link unit 16 (i.e., the five arms) makes it possible to minimize the outside diameter dimensions D1 through D5 of the link unit 16 (i.e., the five arms), and, in an instance in which the arms of the link unit 16 are tubes, to reduce the wall thickness of each of the arms.

Minimizing the outside diameter dimension D1 through D5 (see FIG. 2) or the wall thickness of each of the arms in the link unit 16 makes it possible to reduce cost and weight. Thus, reducing the weight of the link unit 16 (i.e., the five arms) makes it possible to reduce the unsprung weight, secure adequate road-following performance of the rear wheel 31, and maintain satisfactory riding comfort.

The link unit 16 (i.e., the five arms) is connected to the side towards the subframe 12 by each of the respective support brackets 44, 47, 51, 54, 57. Preventing the damper reaction force F1 from acting as a rotation force on the knuckle 14 makes it possible to inhibit a torsional force from acting on each of the support brackets 44, 47, 51, 54, 57. It thereby becomes possible to reduce cost and weight while maintaining adequate stiffness for each of the support brackets 44, 47, 51, 54, 57.

Next, a description will be given for an example in which the force acting to turn the rear wheel 31 in the toe-in direction is supported by the front upper arm 34, with reference to FIG. 9.

Figure 9:
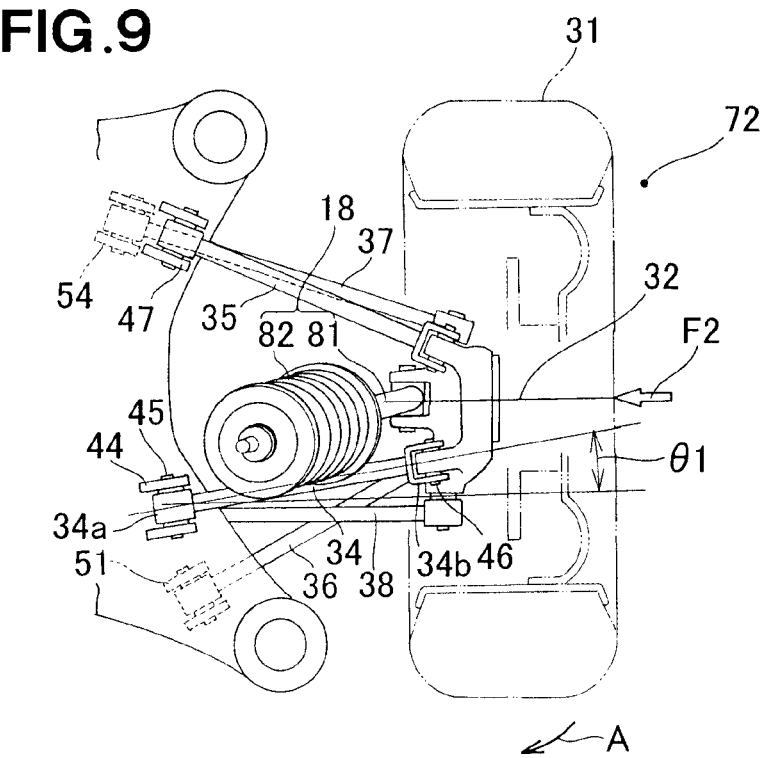
FIG. 9 is a view showing an example in which the force turning the rear wheel in the toe-in direction is supported by the front upper arm.

As shown in FIG. 9, the front upper arm 34 is provided to the front side, with respect to the vehicle, of the rotation center 32 of the rear wheel 31. The tilt angle θ1 of the front upper arm 34 in the width direction of the vehicle is set so as to be smaller than that of the rear upper arm 35. Specifically, the front upper arm 34 is oriented so as to approach the direction of extension of the rotation center 32. It is thereby possible, in an instance in which the lateral force F2 acts on the rear wheel 31 from the road surface 72, to support, using the front upper arm 34, a force that acts to turn the rear wheel 31 in the toe-in direction (i.e., direction indicated by arrow A) about the elastic kingpin axis 68 in a satisfactory manner, as shown in FIG. 6. Using the front upper arm 34 to support a force that acts to turn the rear wheel 31 in the toe-in direction (i.e., direction indicated by arrow A) makes it possible to minimize the orientation of the rear wheel 31 from changing excessively in the toe-in direction when the lateral force F2 acts on the rear wheel 31 from the road surface 72.

Specifically, the front upper arm 34 is capable of functioning as a control arm for restricting the change in the orientation of the rear wheel 31 in the toe-in direction. It is thereby possible to provide the suspension device 10 with means for adjusting the toe change characteristics of the rear wheel 31, and to increase the degree of freedom in terms of designing the suspension device 10.

The suspension device 10 according to the present invention is not limited to the embodiment described above, and may be modified, improved, or otherwise altered as appropriate. For example, in the embodiments described above, a description was given for an example in which the suspension device 10 is applied for a link unit 16 in which a line that links the intersection 64 of respective axes (i.e., extension lines) 62, 63 of the front and rear upper arms 34, 35 and an intersection 67 of respective axes (i.e., extension lines) 65, 66 of the front and rear lower arms 36, 37 is the elastic kingpin axis 68. For example, it is also possible to apply the suspension device 10 to a link unit 90 (see FIG. 10) in which lines extended from axes do not intersect.

Figure 10:
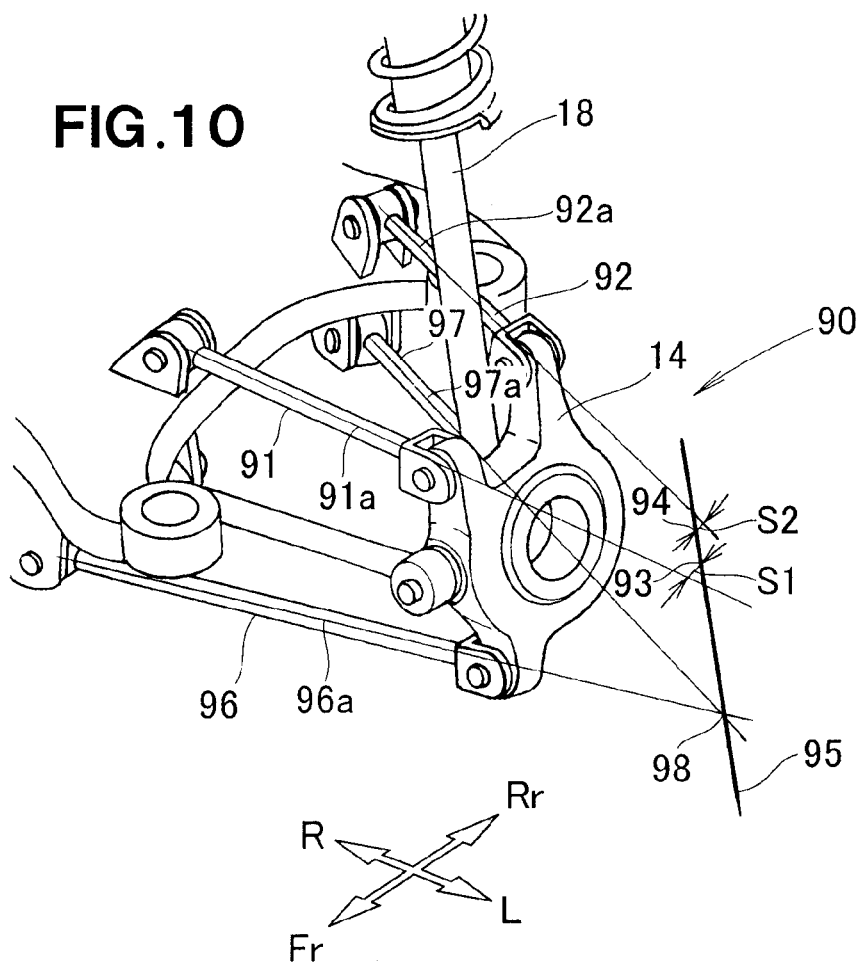
FIG. 10 is a perspective view showing an example of a modification of the suspension device according to the present invention.
Figure 11:
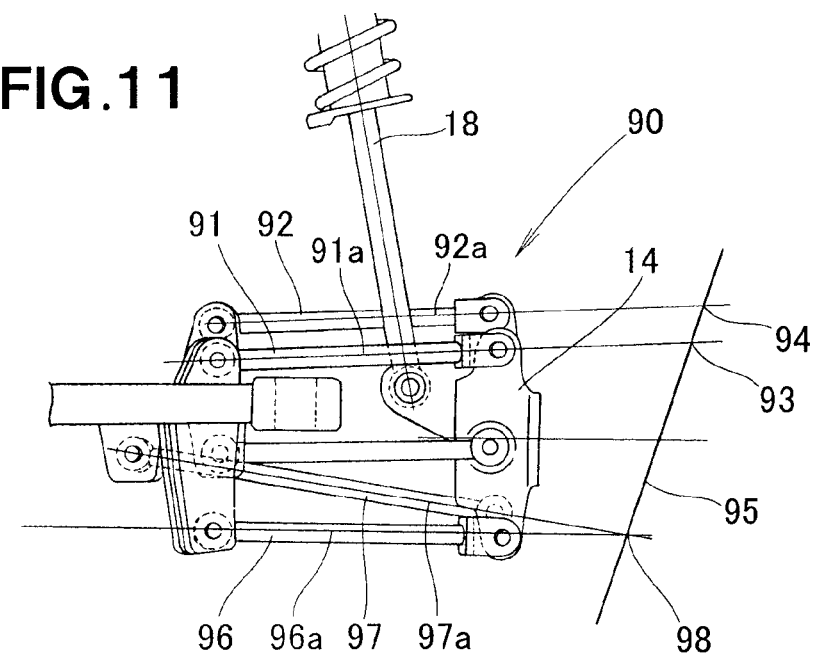
FIG. 11 is a side view of the suspension device shown in FIG. 10.
Figure 12:
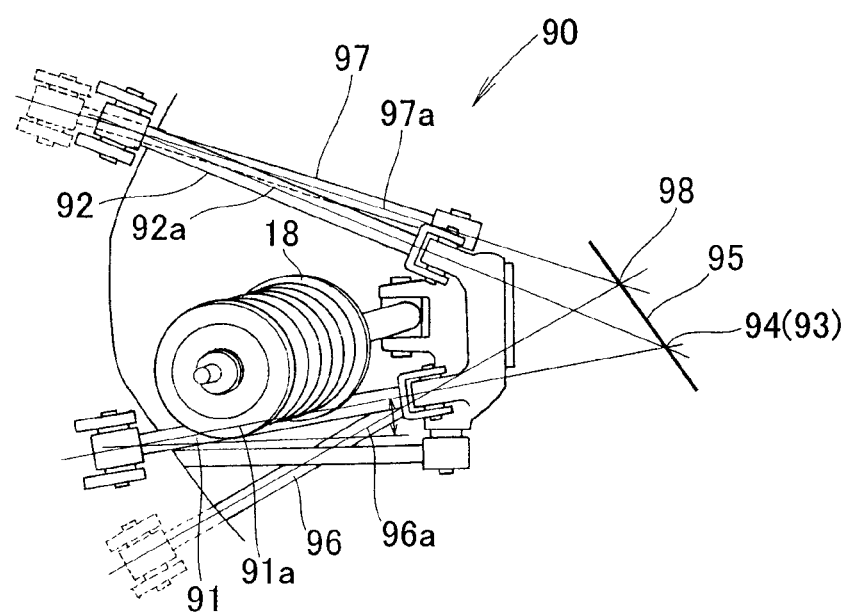
FIG. 12 is a plan view of the suspension device shown in FIG. 10.

Thus, link units include those in which lines extended from respective axes 91a, 92a of the front and rear upper arms 91, 92 do not intersect, such as a link unit 90 shown in FIGS. 10 through 12. In the instance of this link unit 90, a line passing through a position at which the line extending from the axis 91a of the front upper arm 91 is the nearest to the line extending from the axis 92a of the rear upper arm 92 represents an elastic kingpin axis 95.

Specifically, as shown in FIG. 10, a front proximal position 93, at a distance S1 from the line extending from the axis 91a of the front upper arm 91; and a rear proximal position 94, at a distance S2 from the line extending from the axis 92a of the rear upper arm 92, represent positions at which the distance from each of the extension lines to the elastic kingpin axis 95 is the smallest. In this instance, a line linking an intersection 98 of respective axes (i.e., extension lines) 96a, 97a of the front and rear lower arms 96, 97; the front proximal position 93; and the rear proximal position 94 represents the elastic kingpin axis 95. FIGS. 11 and 12 show instances in which each of the distances S1, S2 is zero (i.e., S1=0, S2=0). A similar effect can be obtained by applying the suspension device according to the present invention to the examples of modification of the link unit 90 shown in FIGS. 10 through 12.

The orientation of an elastic kingpin axis can be similarly determined in an instance of a link unit in which the respective axes (i.e., extension lines) 91a, 92a of the front and rear upper arms 91, 92 intersect and the respective axes (i.e., extension lines) 96a, 97a of the front and rear lower arms 96, 97 do not intersect. The orientation of an elastic kingpin axis can also be similarly determined in an instance of a link unit in which the respective axes (i.e., extension lines) 91a, 92a of the front and rear upper arms 91, 92 do not intersect and the respective axes (i.e., extension lines) 96a, 97a of the front and rear lower arms 96, 97 do not intersect. A similar effect can be obtained by applying the suspension device according to the present invention to a link unit comprising an elastic kingpin axis of such description.

In the embodiments, the rear wheel 31 is used as an example of a wheel to which the suspension device 10 according to the present invention is applied; however, this is not provided by way of limitation. The suspension device 10 can also be applied to a front wheel.

Also, the shape of each of the vehicle body 11, the subframe 12, the knuckle 14, the link unit 16, the damper 18, the rear wheel 31, the front upper arm 34, the rear upper arm 35, the front lower arm 36, the rear lower arm 37, the control arm 38, the shock absorber 81, the upper connection section 81a, the lower connection section 81b, and similar components described in the embodiments is not limited to the example described, and can be modified as appropriate.

INDUSTRIAL APPLICABILITY

The present invention is suitable for application in a motor vehicle comprising a suspension device in which a knuckle for supporting a wheel is supported by plurality of arms, and a cushioning device is connected to the knuckle.

REFERENCE SIGNS LIST

10 Suspension device
11 Vehicle body
12 Subframe

14 Knuckle
16 Link unit
18 Damper (cushioning device)
31 Rear wheel (wheel)
32 Rotation center
33 Extension line
34 Front upper arm
35 Rear upper arm
36 Front lower arm
37 Rear lower arm
38 Control arm
68 Elastic kingpin axis
72 Ground contact surface (road surface)
73 Intersection (intersection between elastic kingpin axis and ground contact surface)
74 Ground contact center
81 Shock absorber
81a Upper connection section
81b Lower connection section
84 Damper axial line
F1 Damper reaction force (reaction force of cushioning device)
θ1 Tilt angle of front upper arm
θ2 Tilt angle of elastic kingpin rotation axis
θ3 Tilt angle of damper rotation axis

The invention claimed is:

1. A suspension device comprising:
a plurality of arms;
a knuckle connected to a vehicle body of a vehicle through the arms for supporting a wheel of the vehicle; and
a damper for producing a reaction force directed in an up-and-down direction in response to an up-and-down movement of the wheel so as to apply the reaction force to the knuckle, the damper having an upper connection section connected to the vehicle body and a lower connection section connected to the knuckle, wherein
an intersection of an elastic kingpin axis of the wheel and a road surface is disposed rearward of a contact patch center of the wheel,
the elastic kingpin axis tilts forward of the vehicle and passes through a point offset vertically downwardly from a center of rotation of the wheel,
the lower connection section of the damper is disposed on a line extending substantially vertically through the center of rotation of the wheel,
the damper has a longitudinal axis tilting forward and laterally inwardly of the vehicle, and
wherein the elastic kingpin axis is a steering axis that links points at which no change in the toe angle or the steering angle occurs when a force is applied to the wheel.

2. The suspension device according to claim 1, wherein the plurality of arms comprises front and rear upper arms connected to portions of the knuckle disposed above the center of rotation of the wheel, and at least one lower arm connected to a portion of the knuckle disposed below the center of rotation of the wheel, the front upper arm being disposed forward of the center of rotation of the wheel, the front upper arm tilting at a smaller angle than the rear upper arm relative to an axis extending laterally of the vehicle.

3. The suspension device according to claim 1, wherein the longitudinal axis of the damper tilts at an angle approximating to an angle at which the elastic kingpin axis tilts.

4. The suspension device according to claim 1, wherein the plurality of arms comprises front and rear upper arms connected to portions of the knuckle disposed above the center of rotation of the wheel, and front and rear lower arms connected to a portion of the knuckle disposed below the center of rotation of the wheel, and the damper extends between front and rear upper arms and between the front and rear lower arms.

5. The suspension device according to claim 1, wherein the front upper arm is oriented so as to approach a direction of extension of a center of rotation of the wheel.

* * * * *

UNITED STATES PATENT AND TRADEMARK OFFICE
CERTIFICATE OF CORRECTION

| | |
|---|---|
| PATENT NO. | : 8,444,160 B2 |
| APPLICATION NO. | : 13/264605 |
| DATED | : May 21, 2013 |
| INVENTOR(S) | : Okamoto et al. |

It is certified that error appears in the above-identified patent and that said Letters Patent is hereby corrected as shown below:

In the claims:

Col. 12, Claim 5:
Line 1, change "according to claim 1" to --according to claim 4--

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,444,160 B2
APPLICATION NO. : 13/264605
DATED : May 21, 2013
INVENTOR(S) : Okamoto et al.

It is certified that error appears in the above-identified patent and that said Letters Patent is hereby corrected as shown below:

In the claims:

Column 12, line 34 (Claim 5, line 1)

change "according to claim 1" to --according to claim 4--

This certificate supersedes the Certificate of Correction issued June 25, 2013.

Signed and Sealed this
Twenty-third Day of July, 2013

Teresa Stanek Rea
*Acting Director of the United States Patent and Trademark Office*